(12) United States Patent
Blanchard

(10) Patent No.: US 6,702,059 B2
(45) Date of Patent: Mar. 9, 2004

(54) TRANSMISSION DEVICE AND MACHINE PROVIDED WITH SUCH A TRANSMISSION DEVICE

(75) Inventor: Robert Blanchard, Le Boupere (FR)

(73) Assignee: France Reducteurs S.A., Les Herbiers (FR)

( * ) Notice: Subject to any disclaimer, the term of this patent is extended or adjusted under 35 U.S.C. 154(b) by 97 days.

(21) Appl. No.: 09/971,025

(22) Filed: Oct. 5, 2001

(65) Prior Publication Data

US 2003/0066704 A1 Apr. 10, 2003

(51) Int. Cl.[7] .............................................. B60K 17/26
(52) U.S. Cl. ........................ 180/383; 180/350; 180/351; 180/357; 180/366; 180/374
(58) Field of Search ................................. 180/350, 351, 180/352, 353, 356, 357, 358, 366, 374, 377, 383

(56) References Cited

U.S. PATENT DOCUMENTS

| | | | | |
|---|---|---|---|---|
| 4,020,619 A | * | 5/1977 | Massaro ..................... 56/11.2 |
| 4,117,652 A | * | 10/1978 | Jones et al. .................. 56/11.8 |
| 4,132,121 A | * | 1/1979 | Clarke ......................... 474/27 |
| 4,409,779 A | * | 10/1983 | Bent et al. .................... 56/11.3 |
| 4,416,107 A | * | 11/1983 | Hoff ............................. 56/11.3 |
| 4,428,180 A | * | 1/1984 | Carlson ........................ 56/11.3 |
| 4,841,794 A | * | 6/1989 | Hikishima ..................... 74/371 |
| 4,879,867 A | * | 11/1989 | Wenzel ......................... 56/11.1 |
| 5,497,606 A | * | 3/1996 | Baxter ......................... 56/16.9 |
| 6,095,294 A | * | 8/2000 | McGourthy et al. ......... 188/166 |
| 6,354,414 B1 | * | 3/2002 | Sueshige et al. .............. 192/45 |
| 6,434,918 B1 | * | 8/2002 | Csonka et al. ............... 56/13.4 |
| 6,454,040 B1 | * | 9/2002 | Fukuda ........................ 180/374 |
| 6,475,109 B2 | * | 11/2002 | Blanchard .................... 474/101 |
| 6,524,205 B1 | * | 2/2003 | Irikura et al. ................. 475/23 |

* cited by examiner

Primary Examiner—Paul N. Dickson
Assistant Examiner—Toan C To
(74) Attorney, Agent, or Firm—Young & Thompson

(57) ABSTRACT

A transmission device for a self-propelled wheeled machine, this device, driven by a belt from a drive shaft, includes a housing mounted floating relative to the chassis of the machine containing a mechanism for reducing and clutching between an input shaft and at least one output shaft. This device is characterized in that the housing is constituted by half casings of which one includes a molded-on tongue loaded by a spring so as to exert on the housing a couple for swinging the housing about the output shaft, this tongue including, adjacent its end, an abutment immobilizing a sheath of a control cable acting on a clutch control lever of the device.

20 Claims, 5 Drawing Sheets

TRANSMISSION DEVICE AND MACHINE PROVIDED WITH SUCH A TRANSMISSION DEVICE

BACKGROUND OF THE INVENTION

The present invention relates to a transmission device of the reducer type for a self-propelled wheeled machine such as a lawnmower, this device, driven by a belt from a drive shaft, comprising a housing containing a reducing and clutching mechanism between an input shaft and at least one output shaft driving the propelling wheels of the machine, this housing being mounted floating relative to the chassis of the machine, as well as a machine provided with such a transmission device.

DESCRIPTION OF THE RELATED ART

The floating mounting of the transmission housing in self-propelled wheeled machines such as lawnmowers, presents a certain number of advantages, particularly as to the time required for mounting and the reliability of the belt tension independently of the manufacturer of the machine. However, the solutions used up to now remain complicated because they require providing pieces adapted to be fixed to the housing. However, the great vibrations generated during operation of the device can lead to untimely disassembly of the pieces or breaking of certain pieces subject to bending or torsion.

SUMMARY OF THE INVENTION

An object of the present invention is to provide a transmission device of a new type, whose design permits obtaining a monolithic anti-bending and anti-torsion assembly adapted to operate even in an environment in which it is subjected to great vibration.

To this end, the invention has for its object a transmission device of the reducer type for a self-propelled wheeled machine such as a lawnmower, this device, driven by a belt from a drive shaft, comprising a housing containing a mechanism for reducing and clutching between an input shaft and at least one output shaft driving the propelling wheels of the machine, this housing being mounted floating relative to the chassis of the machine, characterized in that the housing is constituted of half casings assembleable on a joint plane, one of these half casings comprising, formed by molding, a tongue loaded by a spring so as to exert on the housing a swinging couple of the housing about the output shaft to maintain a continuous tension in the belt, this tongue moreover comprising, adjacent its end, an abutment immobilizing a sheath of a control cable acting on a control lever for clutching of the device.

Thanks to the monobloc design of the tongue and of the half casing, the molded tongue forming with the half casing of the housing a monolithic assembly, such a transmission device can operate in an environment subjected to large vibrations without leading to any disassembly between the tongue and the casing. This results in increased reliability of the transmission device.

The invention also has for its object a self-propelled wheeled machine such as a lawnmower, this machine comprising a transmission device of the reduction type driven by a belt from a drive shaft, this device comprising a housing containing a mechanism for reduction and clutching between an input shaft and at least one output shaft for driving the propelling wheels of the machine, this housing being mounted floating relative to the chassis of the machine, characterized in that the transmission device is of the above type.

BRIEF DESCRIPTION OF THE DRAWINGS

The invention will be better understood from a reading of the following description of embodiments, with reference to the accompanying drawings, in which.

DESCRIPTION OF THE PREFERRED EMBODIMENTS

Figure 1:
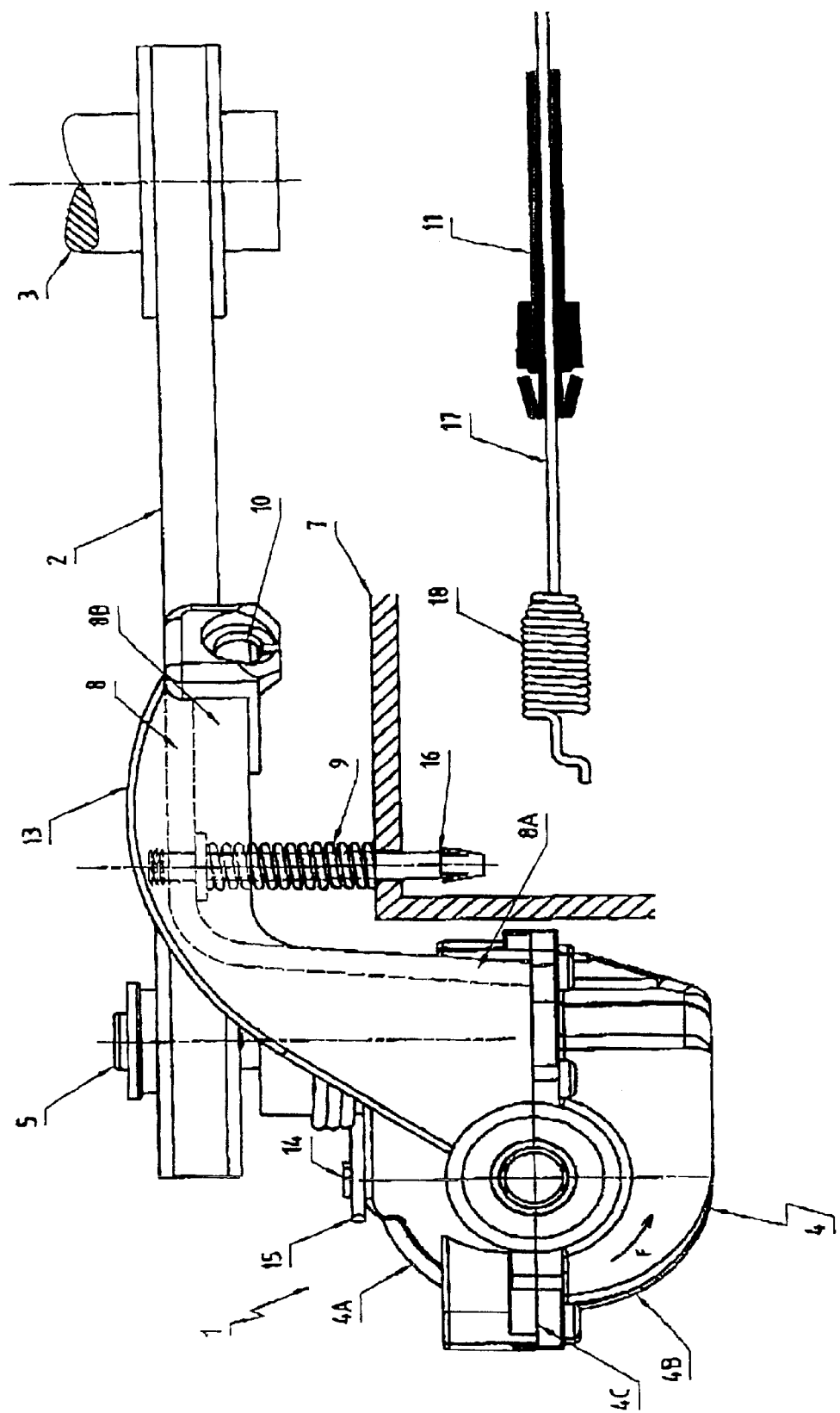
FIG. 1 is a schematic view of a transmission device according to the invention, the chassis of the machine having been partially shown.
Figure 2:
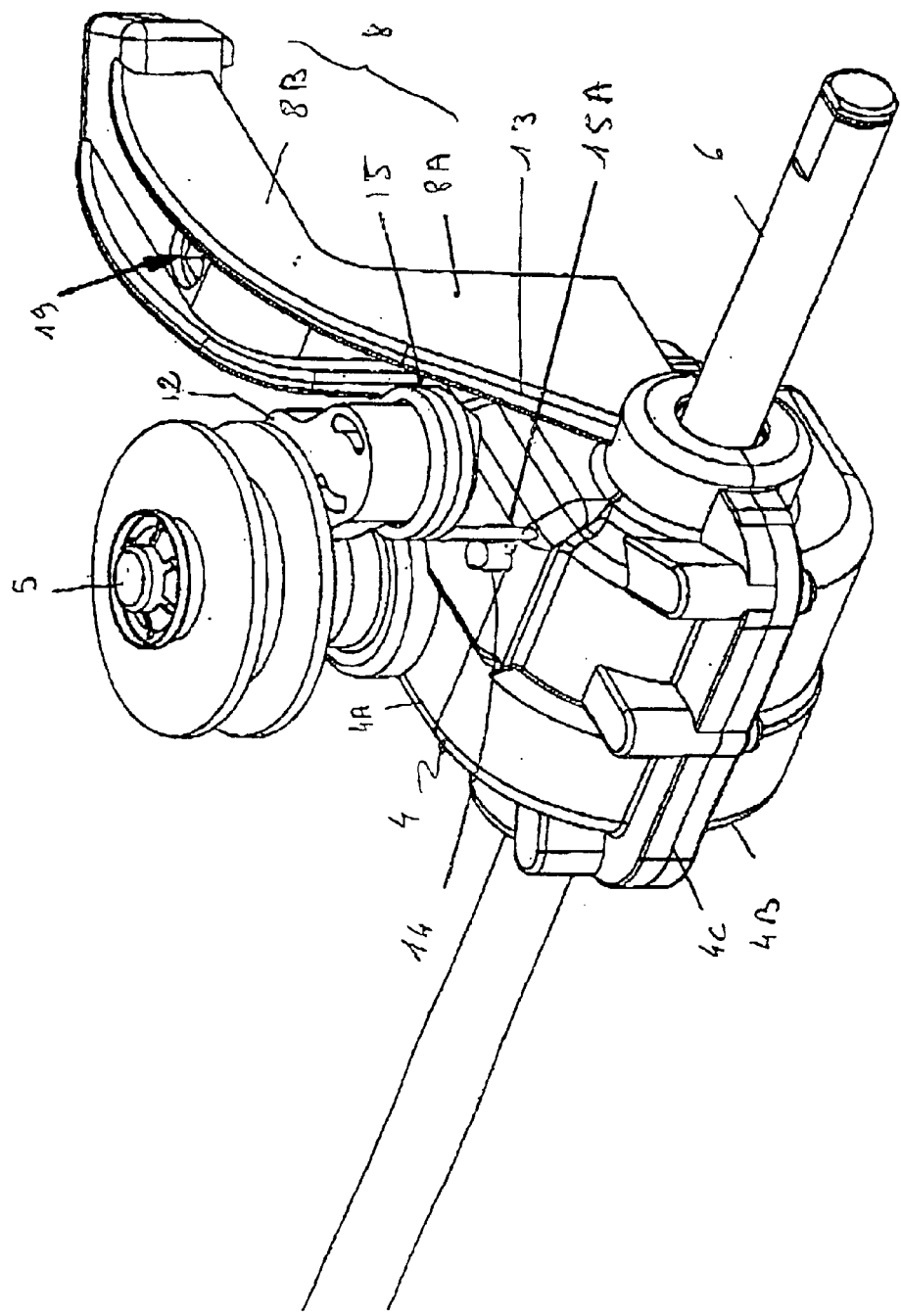
FIG. 2 is a fragmentary perspective view of a transmission device according to the invention, at least the belt drive of the device having been omitted.
Figure 3:
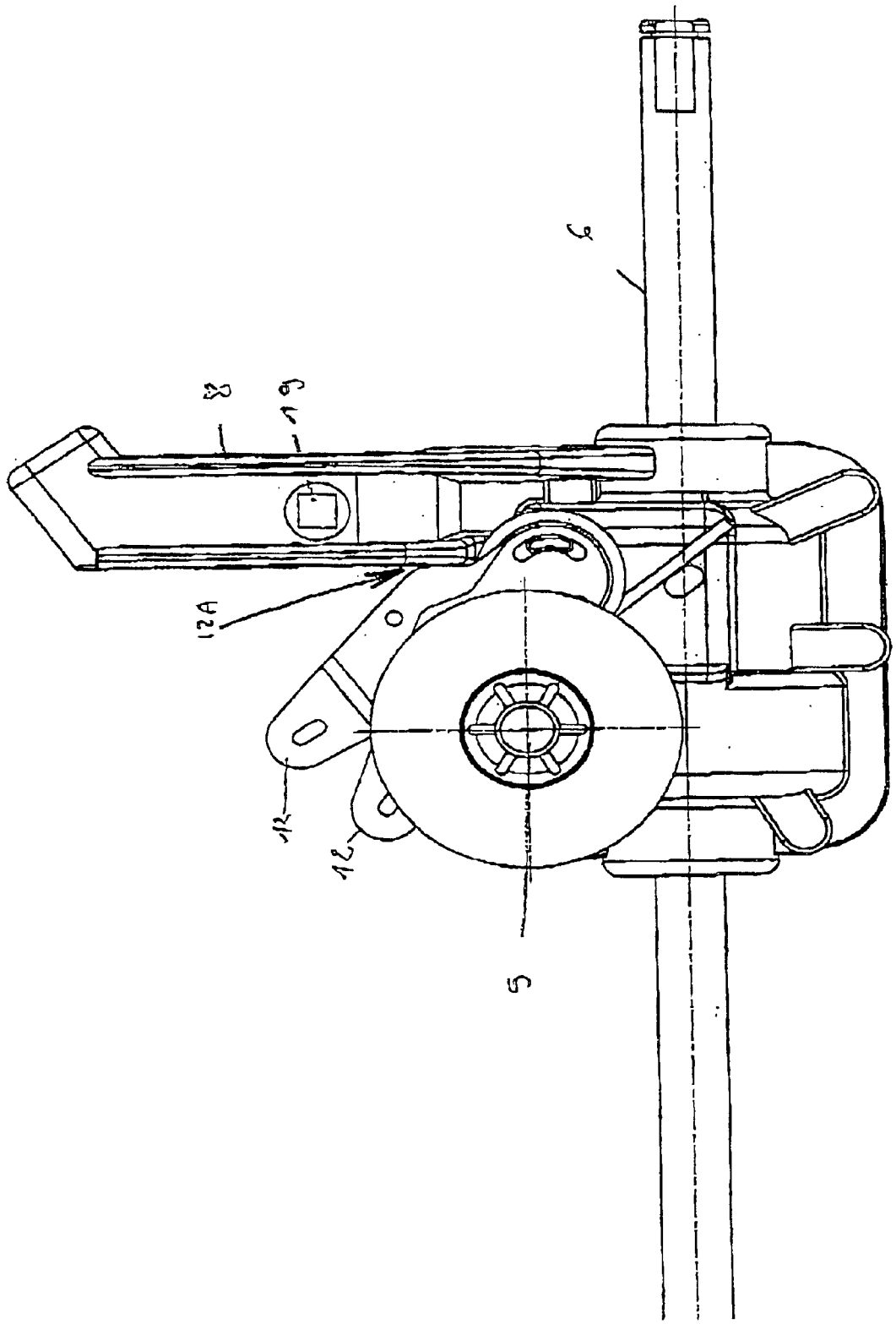
FIG. 3 is a fragmentary schematic plan view of a transmission device according to the invention, the control lever for clutching having been shown in various positions.
Figure 4:
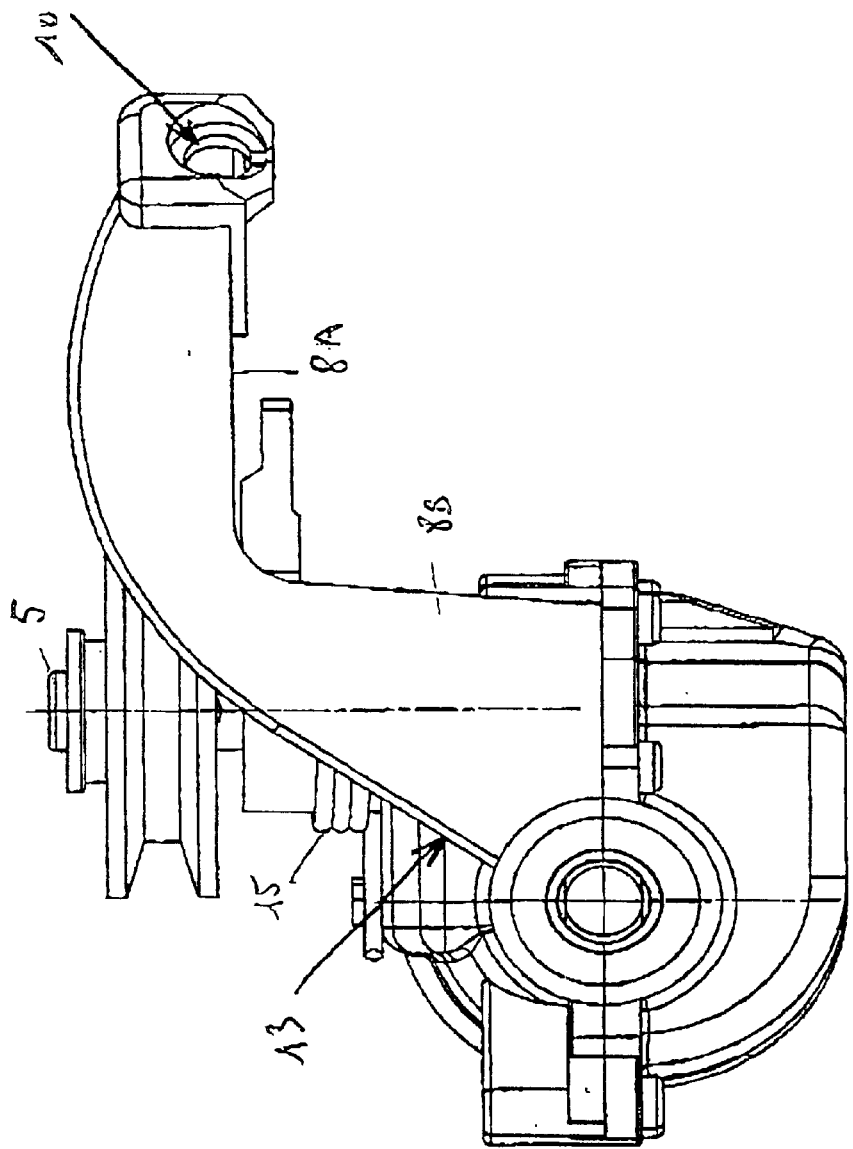
FIG. 4 is a fragmentary schematic front view of a transmission device according to the invention.
Figure 5:
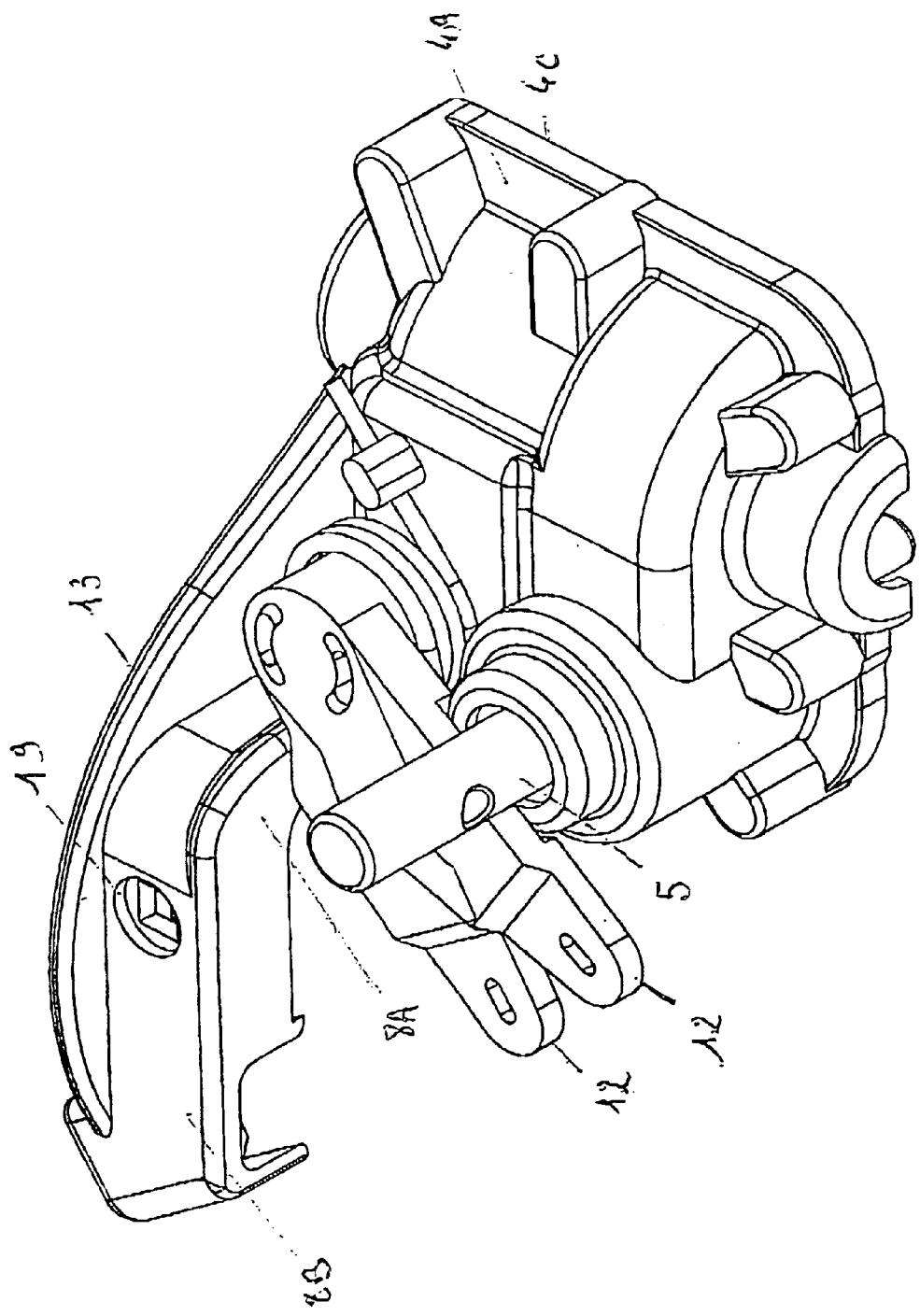
FIG. 5 is a fragmentary schematic perspective view from above, of the half casing provided with a tongue of the transmission device according to the invention, the control lever for clutching having again been shown in various positions.

As mentioned above, the transmission device 1, according to the invention, is more particularly adapted to equip a self-propelled wheeled machine, such as a lawnmower. In the illustrated examples, the chassis 7 of a lawnmower has been partly shown.

This transmission device 1 comprises a housing 4 containing a mechanism for reducing and clutching between an input shaft 5 and at least one output shaft 6 for driving the wheels (not shown) for advancing the machine. The mechanism for reducing and clutching between the input shaft 5 and the output shaft 6 has not been shown, because it is well known to those skilled in this art. This mechanism for reducing and clutching can for example be constituted by at least one drive member such as an endless screw constituting the input shaft 5, this endless screw engaging with a tangential toothed wheel mounted on the shaft 6 for driving the wheels and being disposed within the housing 4, this toothed wheel comprising internal conical bearing surfaces engaging with clutch cones mounted securely in rotation with the output shaft 6, at least one of the cones being mounted freely axially on said output shaft 6. These cones can be brought together or spaced apart from each other by means of a clutch control lever 12 at least partially protruding from the housing 4 and shown in FIGS. 2 to 5.

The input shaft 5 constituting the drive shaft is driven in rotation by means of a belt transmission 2, this belt 2 extending between the drive shaft 3 of the machine and the input shaft 5 of the reducer.

The housing 4, containing the mechanism for reducing and clutching, is itself mounted floating relative to the chassis 7 of the machine. By floating mounting, is meant a mounting in which the housing 4 can swing about the output shaft 6 for driving the propelling wheels of the machine.

As shown in the drawings, this housing 4 is constituted by half casings 4A, 4B generally of synthetic material and made by molding. These two casings are assembled on a joint plane 4C. One (4A) of these half casings comprises, integrally molded thereon, a tongue 8 loaded by a spring 9. This spring 9 permits exerting on the housing 4 a swinging couple of the housing 4 about the output shaft 6 to maintain continuous tension in the belt 2. This spring thus exerts a couple as shown by the arrow F in FIG. 1. It thus permits the casing 4 to swing to the left in FIG. 1 so as to ensure, by movement toward the left of the input shaft 5 of the transmission device, a tension in the belt 2. Because of the monobloc design of the tongue 8 and of the housing 4, any risk of disassembly between tongue 8 and housing 4 is rendered impossible. There results a precise action of the spring 9 on the assembly of the housing 4, permitting precise positioning of this housing 4 and consequently a permanent tension in the belt 2. The tongue 8 moreover comprises, adjacent its end and formed in a single piece with the tongue 8, an abutment 10 immobilizing a sheath 11 of a control cable 17 acting on the lever 12 that controls the clutching of the device. The detail of this control cable is more particularly shown in FIG. 1. It will be noted that, in this particular case, the cable 17 for controlling clutching is fixed to the lever 12 for controlling clutching by means of a traction spring 18. This cable 17 is fixed at its other end to a handle located generally on the handlebars of the machine in the case of a lawnmower. Action on this handle causes traction in the cable 17 to move the lever 12 in the direction of the engaged position of the clutch. The sheath 11 of the cable 17 comprises itself, at its end, a protrusion permitting immobilization of the sheath 11 against the abutment 10 of the tongue 8.

In the example shown in FIGS. 1 to 5, the tongue 8 molded with one of the half casings of the housing 4, has the general shape of an L. This L gives rise, in the plane of the joint 4C of the half casing 4A, to constitute the first branch 8A of the L, this first branch 8A is prolonged by the second branch 8B of the L carrying the tension spring 9 and the abutment 10 of the sheath of the clutch control cable. As shown in the figures, the end of the second branch 8B of the L is elbowed to receive the abutment 10 for immobilizing the sheath 11 of the cable 17 of the clutch control 6.

To permit spring loading at 9 of the tongue 8 without a deformation of the tongue 8, the two branches 8A, 8B of the tongue 8 have, in transverse cross-section, a U-shaped profile so as to rigidify said tongue 8 in the transverse and longitudinal direction. Thus, the U of the branch 8B of the L, which starts in the joint plane 4C of the half casing 4A, has a U-shaped cross-section opening toward the housing 4. The U-shaped cross-section of the branch 8B of the L, carrying the tension spring 9 and the abutment 10 for the sheath of the cable of the clutch control 6, has itself a U-shaped opening directed in the direction of the joint plane 4C of the half casings 4A, 4B. The branch 8A of the L thus extends substantially perpendicular to the joint plane 4C of the half casings 4A, 4B whilst the branch 8B of the L extends substantially parallel to the joint plane 4C between the half casings 4A, 4B.

So as to increase the rigidity of the assembly, the tongue 8 is moreover reinforced against the effect of bending by a rib 13 in the form of an arc originating from the joint plane 4C of the half casing 4A, at the height of the output shaft 6 and opening adjacent the end of the second branch 8B of the L. The first branch 8A of the tongue 8 also forms an abutment to the angular displacement of the lever 12 for controlling clutching in the engaged position. This abutment function is more particularly shown in FIG. 3. To this end, the lever 12 for clutch control has a notch 12A whose walls bear against one of the surfaces of the branch 8A of the tongue 8. This surface thus corresponds to the surface of the branch 8A opposite that carrying the arcuate rib. The lever 12 for controlling clutching, whose angular movement is limited in the engaged position by a surface of the tongue 8 and in the unclutched position by the input shaft 5 of the transmission device, comprises a spiral return spring 15 for said lever in the unclutched position. This spring 15 is threaded on the axle of the lever 12 which is an elbowed lever. One end 15A of this spring 15 bears on a lug 14 molded on the half casing 4A, whilst the other end of this spring 15 is introduced into an opening provided in the lever 12 for clutch control.

The torsion spring 9, which spring loads the tongue 8, is itself threaded on a guide rod 16 of which one end is anchored on the second branch 8B of the L whilst the other end is mounted slidably on the chassis 17 of the machine. This mounting is more particularly shown in FIG. 1. To this end, a recess 19 is provided in the second branch 8B of the tongue 8. This recess can be of square cross-section to receive one end of the rod 16. The other end of this rod 16 is itself provided with wings to facilitate the insertion of the rod by snapping into the interior of the chassis 7 of the machine.

The operation of such a transmission device is identical to that of known transmission devices. Once the transmission housing is positioned on the chassis 7 of the machine, the tension of the belt 2 is ensured. During driving in rotation the drive shaft 3 of the machine, the belt 2 ensures the transmission of relative movement of the shaft 3 to the input shaft 3 of the reducing mechanism. The operator thus acts as desired on the control cable 17 of the clutch lever 12 to bring the clutch into the engaged position, thereby ensuring the transmission of the movement of the input shaft 5 to the output shaft 6 to permit movement of the machine.

What is claimed is:

1. Transmission device (1) of a reducing type for a self-propelled wheeled machine, this device, driven by a belt (2) from a drive shaft (3), comprising a housing (4) containing a mechanism for reducing and clutching between an input shaft (5) and at least one output shaft (6) to drive the wheels that move the machine, this housing (4) being mounted floating relative to the chassis (7) of the machine, wherein, the housing (4) comprises two half casings (4A, 4B), the two half casings are assembleable on a joint plane (4C), one (4A) of these half casings comprises an integrally molded tongue (8), the molded tongue acting on a tension spring (9) so as to exert on the housing (4), a couple for swinging the housing (4) about the output shaft (6) to maintain continuous tension in the belt (2), this tongue (8) moreover comprising, adjacent its end, an abutment (10) immobilizing a sheath (11) of a control cable (17) acting on a lever (12) that controls the clutching of the device.

2. Transmission device (1) according to claim 1, characterized in that the tongue (8), molded onto one of the half casings of the housing (4), has a general shape of an L starting from the joint plane (4C) of a half casing (4A) to constitute the first branch (8A) of the L shaped tongue, which is prolonged by the second branch (8B) of the L shaped tongue carrying the tension spring (9) and the abutment (10) immobilizing the sheath of the clutch control cable.

3. Transmission device (1) according to claim 2, characterized in that the two branches (8A, 8B) of the tongue (8) have, in transverse cross-section, a U-shaped profile to rigidity said tongue (8) in the transverse and longitudinal directions.

4. Transmission device according to claim 2, characterized in that the first branch (8A) of the tongue (8) forms an abutment to the angular displacement of the lever (12) for controlling clutching in the engaged position.

5. Transmission device according to claim 2, characterized in that the tongue (8) is reinforced against bending forces by a rib (13) in the form of an arc beginning at the joint plane (4C) of the half casing (4A) to the height of the output shaft (6) and ending adjacent the end of the second branch (8B) of the L shaped tongue.

6. Transmission device according to claim 2, characterized in that the end of the second branch (8B) of the L shaped tongue is elbowed to receive the abutment (10) for immobilizing the sheath (11) of the clutch control cable (17).

7. Transmission device according to claim 2, characterized in that the clutch control lever (12) comprises a spiral spring (15) for returning to the unclutched position, one end (15A) of the spring (15) bearing on a lug (14) molded in the half casing (4A), the other end of this spring (15) being introduced into an opening provided in the clutch control lever (12).

8. Transmission device according to claim 2, characterized in that the torsion spring (9) that spring loads the tongue (8), is threaded on a guide rod (16) of which one end is anchored on the second branch (8B) of the L shaped tongue whilst the other end is mounted slidably on the chassis (7) of the machine.

9. Transmission device according to claim 2, characterized in that the clutch control cable (17) is fixed to the clutch control lever (12) by means of a traction spring (18).

10. Self-propelled wheeled machine, this machine comprising a transmission device (1) of the reducing type driven by a belt (2) from a drive shaft (3), this device comprising a housing (4) containing a mechanism for reducing and clutching between an input shaft (5) and at least one output shaft (6) for driving the wheels for moving the machine, this housing (4) being mounted floating relative to the chassis (7) of the machine, characterized in that the transmission device (1) is according to claim 1.

11. A transmission device (1) for a self-propelled wheeled machine, this device driven by a belt (2) from a drive shaft (3), comprising:

a tension spring; and a housing (4) containing a mechanism for reducing and clutching between an input shaft (5) and at least one output shaft (6) to drive the wheels that move the machine, the housing (4) being mountable, via the tension spring, floating relative to the chassis (7) of the machine, the housing (4) comprising two half casings (4A, 4B) assembled on a joint plane (4C), one (4A) of these half casings comprising an integrally molded tongue (8), the tension spring mounted between the chassis of the machine and the tongue to exert on the housing a force for swinging the housing (4) about the output shaft (6) to maintain continuous tension in the belt (2), the tongue (8) comprising, adjacent an end, an abutment (10) immobilizing a sheath (11) of a clutch control cable (17).

12. A transmission device (1) for a self-propelled wheeled machine, this device, driven by a belt (2) from a drive shaft (3), comprising:

a tension spring; and a housing (4) containing a mechanism for reducing and clutching between an input shaft (5) and at least one output shaft (6) to drive the wheels that move the machine, the housing (4) being mountable, via the tension spring, floating relative to the chassis (7) of the machine, the housing (4) comprising two half casings (4A, 4B), the two half casings assembled on a joint plane (4C), one (4A) of these half casings comprising an integrally molded tongue (8), the tension spring mounted between the chassis of the machine and the tongue so as to exert on the housing a force for swinging the housing (4) about the output shaft (6) to maintain continuous tension in the belt (2), the tongue (8) comprising, adjacent an end, an abutment (10) immobilizing a sheath (11) of a clutch control cable (17), the tongue having a general shape of an L starting from the joint plane (4C) of a half casing (4A) to constitute a first branch (8A) of the L shaped tongue, which is prolonged by a second branch (8B) of the L shaped tongue carrying the tension spring (9) and the abutment (10).

13. Transmission device (1) according to claim 12, characterized in that the two branches (8A, 8B) of the tongue (8) have, in transverse cross-section, a U-shaped profile to rigidity said tongue (8) in the transverse and longitudinal directions.

14. Transmission device according to claim 12, characterized in that the first branch (8A) of the tongue (8) forms an abutment to the angular displacement of the lever (12) for controlling clutching in the engaged position.

15. Transmission device according to claim 12, characterized in that the tongue (8) is reinforced against bending forces by a rib (13) in the form of an arc beginning at the joint plane (4C) of the half casing (4A) to the height of the output shaft (6) and ending adjacent the end of the second branch (8B) of the L shaped tongue.

16. Transmission device according to claim 12, characterized in that the end of the second branch (8B) of the L shaped tongue is elbowed to recieve the abutment (10) for immobilizing the sheath (11) of the clutch control cable (17).

17. Transmission device according to claim 12, characterized in that the clutch control lever (12) comprises a spiral spring (15) for returning to the unclutched position, one end (15A) of the spring (15) bearing on a lug (14) molded in the half casing (4A), the other end of this spring (15) being introduced into an opening provided in the clutch control lever (12).

18. Transmission device according to claim 12, characterized in that the torsion spring (9) that spring loads the tongue (8), is threaded on a guide rod (16) of which one end is anchored on the second branch (8B) of the L shaped tongue whilst the other end is mounted slidably on the chassis (7) of the machine.

19. Transmission device according to claim 12, characterized in that the clutch control cable (17) is fixed to the clutch control lever (12) by means of a traction spring (18).

20. Self-propelled wheeled machine, this machine comprising a transmission device (1) of the reducing type driven by a belt (2) from a drive shaft (3), this device comprising a housing (4) containing a mechanism for reducing and clutching between an input shaft (5) and at least one output shaft (6) for driving the wheels for moving the machine, this housing (4) being mounted floating relative to the chassis (7) of the machine, characterized in that the transmission device (1) is according to claim 12.

* * * * *